Feb. 16, 1960 J. W. MALLOY ET AL 2,925,012
ANTISUBMARINE WARFARE PROJECTOR MOUNT
Filed June 2, 1953 4 Sheets-Sheet 2

INVENTORS
JUSTIN W. MALLOY
SIDNEY HERSH

BY
ATTORNEYS

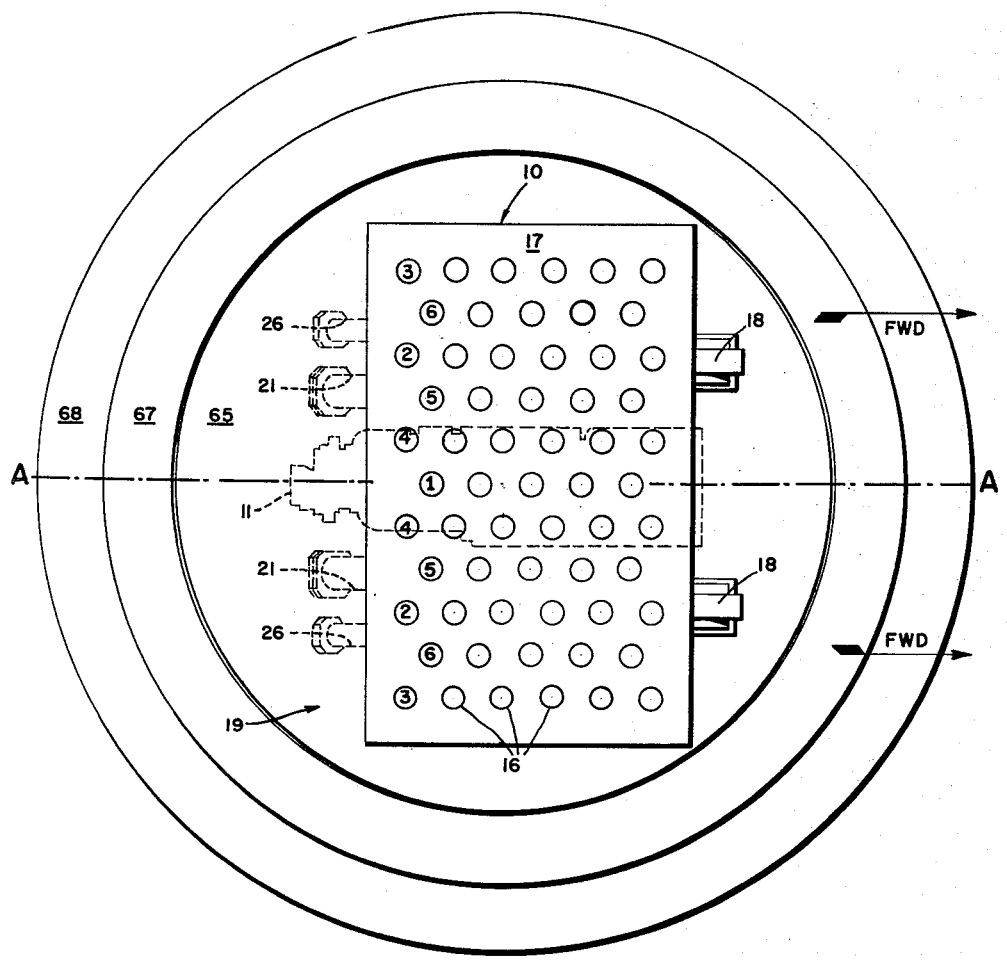

Feb. 16, 1960     J. W. MALLOY ET AL     2,925,012
ANTISUBMARINE WARFARE PROJECTOR MOUNT
Filed June 2, 1953     4 Sheets-Sheet 4
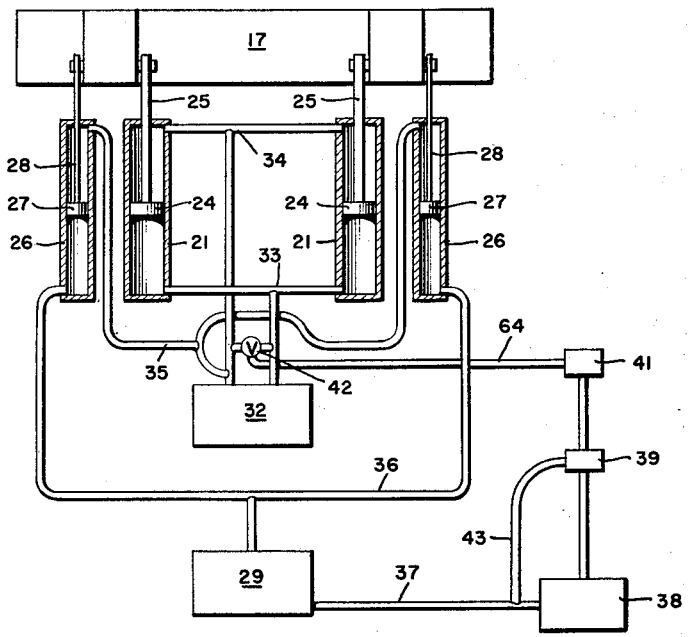
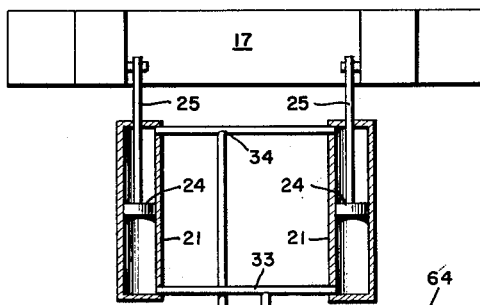
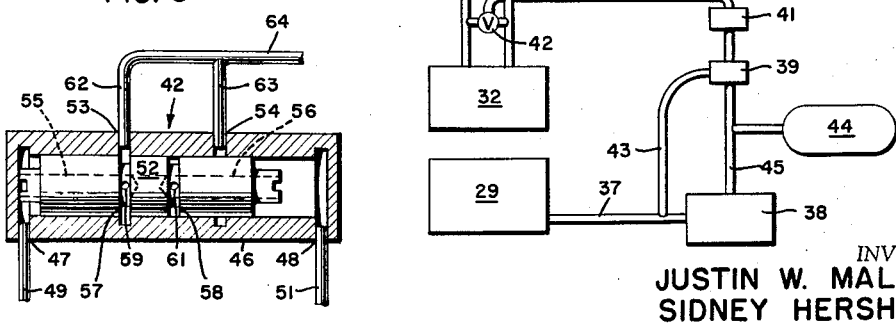
INVENTORS
JUSTIN W. MALLOY
SIDNEY HERSH
BY
ATTORNEYS

United States Patent Office 2,925,012
Patented Feb. 16, 1960

2,925,012

ANTISUBMARINE WARFARE PROJECTOR MOUNT

Justin W. Malloy, Falls Church, Va., and Sidney Hersh, Silver Spring, Md., assignors to the United States of America as represented by the Secretary of the Navy Application June 2, 1953, Serial No. 359,239

2 Claims. (Cl. 89—1.7)

(Granted under Title 35, U.S. Code (1952), sec. 266)

The invention described herein may be manufactured and used by or for the Government of the United States of America for governmental purposes without the payment of any royalties thereon or therefor.

The present invention relates to antisubmarine warfare devices and more particularly to a stabilized hedgehog projector mount for enabling the projection of a plurality of explosive charges into the sea in such a manner that they fall in a predetermined impact pattern.

Heretofore, several types of projector mounts have been employed which include a firing platform provided with a plurality of rod like members upon which charges may be impaled for projection therefrom. These rod like members are referred to as spigots and the projector as a unit has become known as a hedgehog type of projector. Two of the several types of hedgehog projector mounts will be briefly described. One of these projector mounts included several I beams or cradles suspended on forward and aft trunnions and having a plurality of spigots mounted on each beam, the trunnion bearings being mounted on a box like base frame. This mount was positioned on the vessel in such a manner that the axes of the cradles were parallel to the centerline of the vessel. Such an arrangement enabled the cradles to be tilted by an operator stationed immediately behind the mount through the operation of a hand driven gear train and linkage mechanism so as to provide roll correction and a limited amount of training adjustment in the line of fire. Under certain conditions of operation such a limited amount of training has proved to be insufficient and in order to bring the target into the line of fire the heading of the ship was required to be altered which, in the case of large vessels, is a rather slow procedure. In many cases the target such as a submarine, for example, would have ample time to submerge and undertake evasive tactics before the projector could be fired.

Another type of projector which has been employed was mounted on a trainable platform with the spigots inclined at a fixed angle. In this type of projector the axes of the cradles were arranged so that they were perpendicular to the line of fire thereby to enable various elevation adjustments to be accomplished by a tilting of the cradles, power drives being provided for such purposes as well as for the training of the mount for various azimuth settings. Although this type of projector improved the operational flexibility of the mount over the projector first-mentioned in addition to providing for stabilization of the mount against roll and pitch of the vessel, this type of projector also has been found to have undesirable features. For example, the angular mounting of the base frame places the spigots in a comparatively inaccessable location thereby creating difficulties in the loading of the charges as well as placing the loading personnel in a precarious position on a rolling and pitching vessel. Moreover, the mount is not shielded against adverse weather conditions, the power drives and cradle operating linkages being entirely exposed, thereby completely preventing the operation of the mount and servicing the power drives in the event of a heavy accumulation of ice which may be encountered under certain conditions of operation.

The present invention avoids the disadvantages of the prior art by providing a stabilized mount for hedgehog projectors which not only can be rotated and elevated but provides complete shielding for the power drives for effecting rotational and elevational adjustments, the latter at all times being completely shielded within the ship's structure. This feature of the present invention enables the power drives to be serviced even under the most adverse operational conditions of rough seas and inclement weather.

With the foregoing in mind it is an object of this invention to provide a stabilized mount for hedgehog projectors which is flexible in operation through numerous azimuth and elevation settings.

Another object of the present invention resides in the provision of a hedgehog projector mount wherein the power drives for effecting various elevation and azimuth settings are completely shielded within the ship's structure at all times.

Still another object resides in the provision of a mount for hedgehog projectors with the spigots so arranged as to facilitate the loading of charges thereon.

An additional object of the instant invention is the provision of a hedgehog projector mount which is extremely compact in relation to the number of charges capable of being fired therefrom.

Other objects and many of the attendant advantages of this invention will be readily appreciated as the same becomes better understood by reference to the following detailed description when considered in connection with the accompanying drawings wherein:

Fig. 4 is a top plan view indicating the disposition of the various spigots on the firing platform of the projector;

Fig. 6 is a diagrammatic view with parts shown in section of one form of a hydraulic elevating system which may be employed in the present invention;

Fig. 7 is a diagrammatic view with parts shown in section of another form of hydraulic elevating system which may be employed in the present invention; and Fig. 8 is an enlarged longitudinal sectional view of the shuttle valve employed in the hydraulic elevating systems of Figs. 6 and 7.

Figure 1:
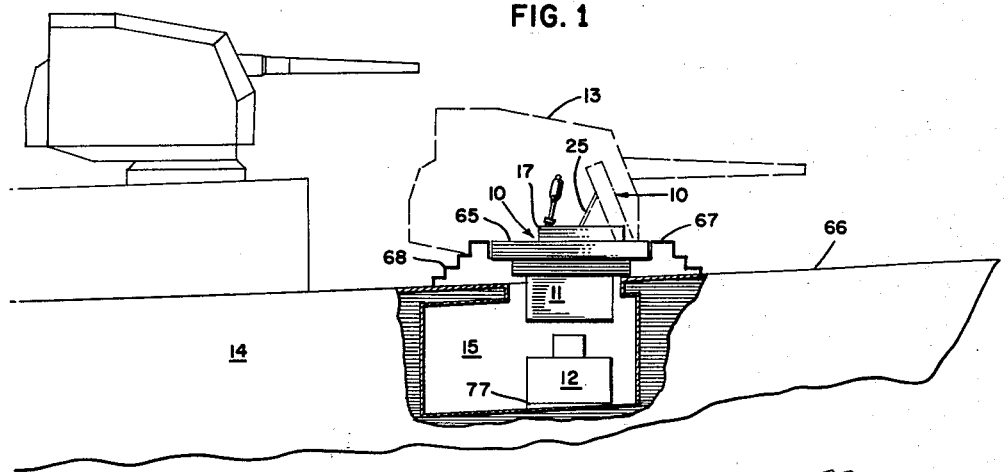
Fig. 1 is a side elevation view with a portion broken away of the forward end of a vessel with certain portions being shown in diagrammatic and phantom form so as to best indicate the comparative space requirements for the projector of the present invention in relation to a conventional 5" single mount gun.

Referring now to the several figures of the drawings and more particularly to Fig. 1 thereof, it will be observed that a hedgehog projector, generally designated by numeral 10, its elevation power drive 11, and the train power drive 12 may be substituted for a forward gun mount 13 on the bow of a vessel 14 with a considerable saving of space. One of the advantageous features of the present invention is readily apparent from an inspection of Fig. 1, namely that both power drives and other actuating mechanisms are located completely below deck, the ammunition handling room 15 for the replaced gun mount 13 being conveniently employed for this purpose.

Figure 2:
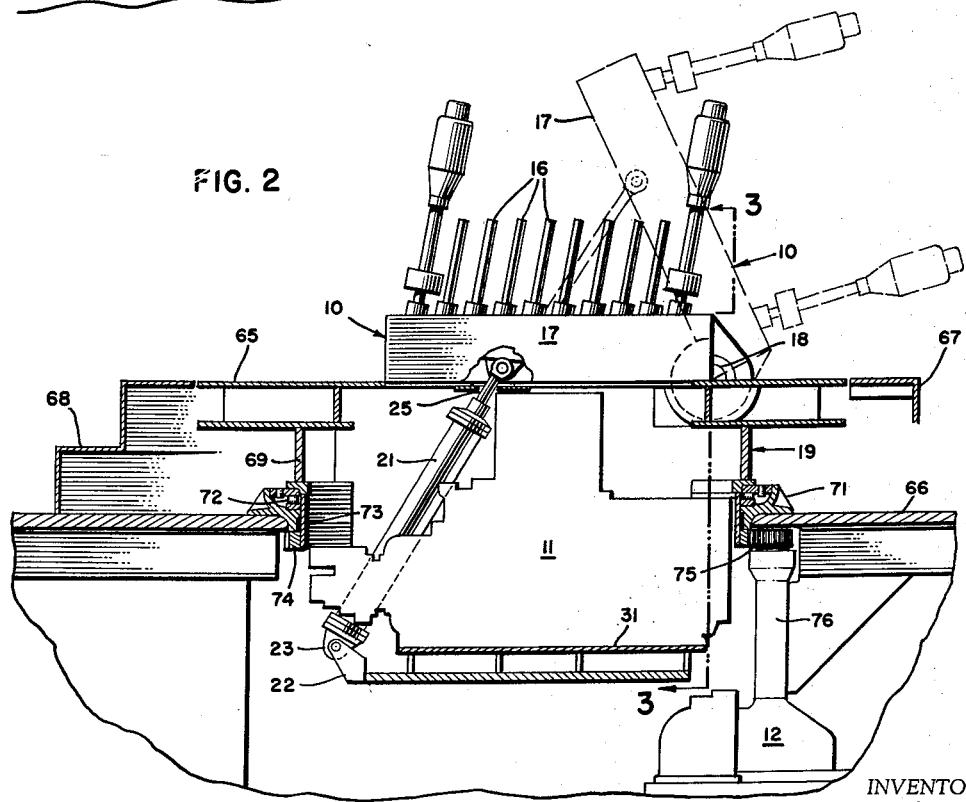
Fig. 2 is a side elevation view of a hedgehog projector constructed in accordance with the present invention with certain portions of the supporting structure and actuating mechanisms being illustrated in section and diagrammatic form, respectively.
Figure 3:
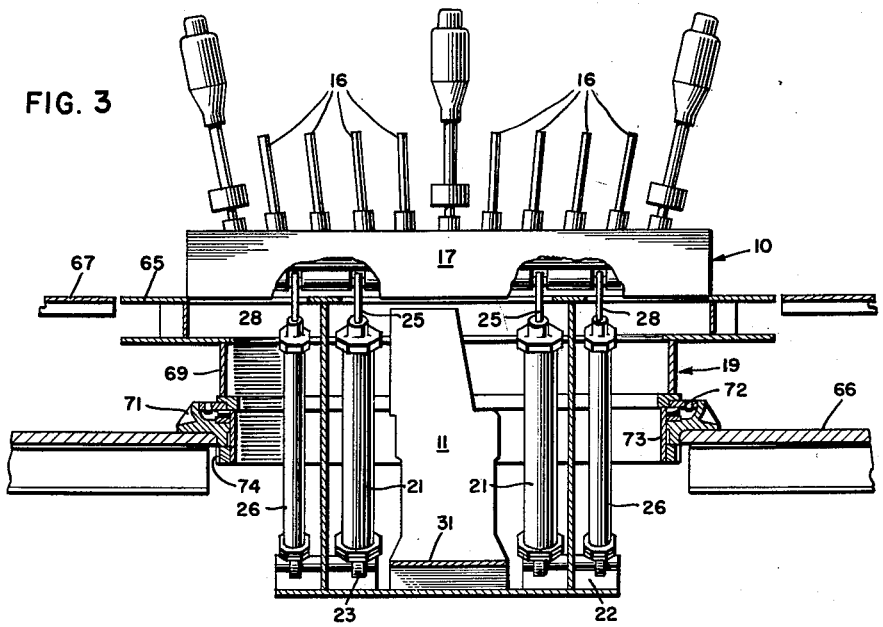
Fig. 3 is an end elevation view of the projector taken along a line substantially corresponding to line 3—3 in Fig. 2.

Reference is now made to Figs. 2, 3 and 4 wherein the details of the present hedgehog projector are disclosed. As will be observed from an inspection of these figures, a plurality of spigots 16 are mounted in divergent relation with one another upon firing platform 17 which is supported at its forward edge by suitable trunnions 18 secured to a portion of a rotatable platform or base ring structure, generally designated by numeral 19. A pair of suitable hydraulic elevating cylinders 21 are pivotally secured to the lower portion or undercarriage 22 as at 23 of the base ring structure 19. Each elevating cylinder 21 is provided with a piston 24, Figs. 6 and 7, and piston rod 25, the latter being pivotally secured within a recess in the underside of firing platform 17 and on the rearward portion thereof. It will now be apparent that when hydraulic fluid is forced under pressure into cylinders 21, each piston 24 and piston rod 25 associated therewith will function to tilt the firing platform 17 to a spigot depressed position such, for example, as that shown by broken lines in Fig. 2. It will be understood that in order to facilitate description, the firing platform will be herein referred to as being depressed when raised to the position indicated by broken lines in Fig. 2 because the spigots are depressed when the firing platform is in that position.

In addition to the elevating cylinders 21, a pair of compensating cylinders 26 may be employed, if desired, each provided with a piston 27, Fig. 6, and a piston rod 28. These compensating cylinders and their associated piston rods are connected between the lower portion of the base ring structure 19 and the firing platform 17 in a manner similar to that in which the elevating cylinders 21 are connected as previously described. The function of the compensating cylinders and the manner in which they cooperate will be described more fully hereinafter.

A suitable alternative arrangement which may be satisfactorily employed in lieu of the compensating cylinders illustrated in Fig. 6 and so long as the force exerted against pistons 24 is in one direction is that arrangement disclosed in Fig. 7 which will be more fully treated in the following paragraphs.

It will be observed that the elevation power drive 11 is mounted on the floor 31 of the undercarriage 22 of base ring structure 19, as is best illustrated in Figs. 2 and 3, so that the elevation power drive and the base ring structure 19 may be rotated as a unit. The elevation power drive 11 may include an electric motor, a variable displacement pump, a hydraulic fluid pressure storage means, a supply tank, and suitable valves.

When it is desired to raise the rear of the firing platform of Fig. 6, to thereby depress the spigots pumps 32 is set in operation in the proper direction whereupon fluid is pumped through a T-shaped connection 33 to the lower ends of cylinders 21 thereby elevating pistons 24, piston rods 25 associated therewith and the firing platform 17. As pistons 24 move upwardly, it will be apparent that a smaller volume of fluid is forced out of cylinders 21 and into T-shaped connection 34 than is pumped into the lower end of cylinders 21 because of the displacement of fluid by piston rod 25 in the upper portion of each cylinder.

Consequently, additional fluid must be added to that in connection 34 at a point upstream from pump 32 in order to compensate for the difference in volumes above and below pistons 24 and thereby avoid cavitation. The addition of fluid is accomplished in the embodiment of Fig. 6, by the upward movement of pistons 27 within compensating cylinders 21, the upper end portion of which is equal in volume to the difference in volumes of the lower and upper portions of cylinders 21. As platform 17 is raised to depress the spigots, the pistons 27 are moved upwardly by reason of the connections between platform 17 and pistons 27 formed by piston rods 28. This upward movement of pistons 27 forces the proper volume of additional fluid through line 35 into connection 34 and the inlet side of pump 32.

When it is desired to lower the firing platform 17, to elevate the spigots pump 32 is reversed and pressurized fluid is pumped through connection 34 into the upper ends of cylinders 21. Fuid is also pumped to the upper ends of cylinders 26 via line 35 so that the total output of pump 32 is equal to the volume of fluid being expelled from the lower send of cylinder 21 and flowing to the input side of pump 32 via connection 33. By reason of the volumetric equality between the sum of the volumes of the upper ends of cylinders 21 and 26 and the volumes of the lower ends of cylinders 21, the danger of cavitation is eliminated. The lower end of each compensating cylinder 26 is connected via line 36 to a supply tank 29 so as to provide a path of flow for fluid in the lower ends of cylinders 26 when the firing platform is lowered to elevate the spigots.

In addition, supply tank 29 is connected to the low pressure side of pump 32 via line 37, supercharge pump 38, transfer valve 39, relief valve 41, and a shuttle valve 42. The shuttle valve 42 is constructed, as illustrated in Fig. 8, so as to always connect supply tank 29 to the low pressure side of pump 32 thereby connecting the low pressure side of the pump to fluid at supercharge pressure. Transfer valve 39 is employed for the purpose of connecting shuttle valve 42 and hence the low pressure side of pump 32 to the supply tank via by-pass line 43 in the event that supercharge pump 38 is not operating in which case the system is nevertheless operable although at a reduced speed. The function of relief valve 41 is to prevent the pressure through shuttle valve 42 from exceeding a desired value.

In the alternative embodiment of the hydraulic system shown in Fig. 7, an accumulator 44 is employed in lieu of the compensating cylinders 26 of Fig. 6 and the hydraulic lines associated therewith. The accumulator is connected to the line 45 between supercharge pump 38 and transfer valve 39. The remaining structure of the embodiments of Figs. 6 and 7 may be identical.

In operation, the system illustrated in Fig. 7 discharges accumulator 44 into the low pressure side of pump 32 when firing platform 17 is raised to depress the spigots and charges the accumulator from the excess coming from the lower end of cylinders 21 when firing platform 17 is lowered to a horizontal position. To amplify the foregoing statement, when pump 32 is set in operation in the proper direction to depress firing platform 17, less fluid is expelled from the upper end of each elevating cylinder 21 than is being pumped into the lower end thereof. The upper end of cylinders 21 is also the low pressure side of pump 32 and, therefore, shuttle valve 42 is connected to that side so as to discharge the contents of accumulator 44 into connection 34 at the pressure established by supercharge pump 38 thereby establishing volumetric equality between the fluid at the inlet and outlet sides of pump 32. Therefore, the danger of cavitation is eliminated.

When the pump 32 is reversed to lower the firing platform to its horizontal or spigot elevated position, the high pressure side of the pump now delivers to the upper end of each cylinder 21 into which a smaller volume of fluid is pumped than is expelled from the low pressure side or the lower end of each cylinder 21. Consequently, shuttle valve 42 is automatically operated to connect the low pressure side of pump 32, or, in other words, connection 33 to accumulator 44 to charge the latter.

It will be obvious that the piston rods 25 and 28 may be covered by telescoping boots (not shown) in order to provide protection of the rods from adverse weather conditions.

Although, any shuttle valve found suitable for the purpose may be employed, the type illustrated in Fig. 8 has been found to be particularly satisfactory and will now be described. The valve housing 46 is provided with ports 47 and 48 at the left and right ends of the housing, respectively, and to which may be connected hose lines 49 and 51, respectively, connected to opposite sides of the pump. A longitudinally slidable valve spool 52 serves to connect intermediate ports 53 and 54 to either side of pump 32, depending upon which side is the low pressure side, by way of longitudinally spaced and longitudinally extending bores 55 and 56 the outer ends of which are in fluid communication with ports 47 and 48, respectively. The inner ends of bores 55 and 56 are in fluid connection with annular grooves 57 and 58 via transverse ports 59 and 61, both respectively. Groove 57 underlies port 53 when the high pressure side of pump 32 is connected via line 51 to the right side of the shuttle valve, as viewed in Fig. 8. Upon reversal of pump 32, valve body 52 will be moved to the right so that groove 58 underlies port 54. Ports 53 and 54 are respectively connected by lines 62 and 63 to a conduit 64 so that shuttle valve 42 always connects the low pressure side of pump 32.

Training of the mount to various azimuth settings is accomplished by means of structure which will now be described. As is most clearly illustrated in Figs. 2 and 3, the platform 65 of base ring structure 19 is rotatably mounted slightly above deck 66 of the vessel and within a stationary loading platform 67 and flush with the top thereof. The necessary number of steps 68 are provided for the stationary loading platform 67 in order that during loading operations personnel may rapidly assume their designated posts either upon the stationary platform 67 or the rotatable platform 65 as the case may be. A depending inwardly offset skirt 69 is secured to the underside surface of platform 65 in any fashion found suitable for the purpose such, for example, as by welding or bolting.

A circular mount stand 71 is securely mounted to the deck adjacent the opening therein which normally connects the turret of a gun with the ammunition handling room 15 immediately therebelow, as indicated in Fig. 1. Roller bearing assemblies 72 are carried between the offset portion 73 of depending skirt 69 and mount stand 71 thereby enabling platform 65 to be rotated relative to mount stand 69 and deck 66. At the lower end of skirt 69 is secured a circular external ring gear 74 which is drivenly connected with pinion 75 connected through a suitable speed reducer 76 to a train power drive and associated mechanisms of any type desired. The train power drive 12 is mounted on a platform 77 within ammunition handling room 15.

Figure 5:
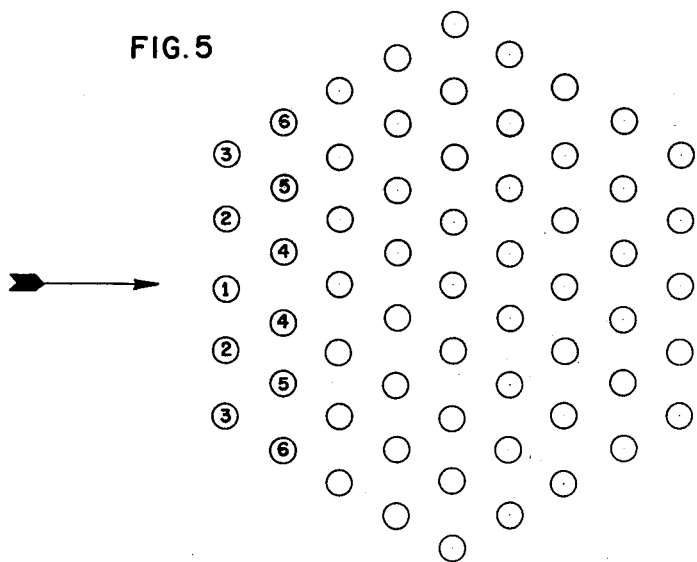
Fig. 5 is a diagrammatic showing of a desired impact pattern which may be obtained on the surface of the sea when a proper spigot disposition and angular arrangement are employed.

It will be understood that any suitable arrangement of spigots 16 and any number thereof may be mounted on the firing platform 17. Merely by way of illustration, the arrangement of spigots disclosed in Fig. 4 has been found to produce satisfactory results in that a relatively large area of the surface of the sea is adequately covered by the impact pattern. One impact pattern which may be attained by a proper disposition of spigots is that illustrated in Fig. 5. The numbered circles in Fig. 4 represent the general positioning of two lines of spigots the numbers indicating the order in which they are fired, this order of firing together with a proper angular disposition of the associated spigots producing the impact pattern of Fig. 5 in which the numbered circles correspond to the various numbered circle designations of Fig. 4. The various spigots are generally simultaneously fired in pairs, one on each side of the center line A—A, Fig. 4, in order that transverse firing loads will cancel one another thereby eliminating undue stress and wear on trunnions 18.

After the firing platform is loaded in the horizontal position and it is desired to fire the charges thereon, the platform is raised to depress the spigots to the desired firing angle and this angle is maintained, during roll and pitch of the ship, by the combined operation of the train and elevation power drives which may be regulated and controlled by suitable receiver-regulator mechanisms and conventional fire control equipment (not shown) which form no part of the present invention. The receiver-regulator mechanisms may function on signals received from the stable element of the vessel.

Obviously many modifications and variations of the present invention are possible in the light of the above teachings. It is, therefore, to be understood that within the scope of the appended claims the invention may be practiced otherwise than as specifically described.

What is claimed is:

1. A charge projector adapted to be carried upon a deck of a vessel and above a predetermined compartment within the structure of the vessel comprising a stationary loading platform rigidly connected to the deck of the vessel, a base ring structure rotatably mounted upon the deck of the vessel for rotation about a vertical axis, the upper surface of said base ring structure defining a surface flush with said loading platform, a firing platform hingedly connected to said surface of said base ring structure for oscillation about a horizontal axis, a plurality of spigots mounted upon said firing platform, said base ring structure extending through an opening in the deck of the vessel and partially extending into the compartment immediately therebeneath, a platform carried by the lowermost portion of said base ring structure, an elevation assembly carried by said platform on the lowermost portion of said base ring structure and including elevating cylinders and hydraulically actuated pistons slidably secured in said cylinders and piston rods pivotally connected to said firing platform, said base ring structure further including an external ring gear, a training mechanism carried within the compartment immediately beneath said base ring structure and drivingly connected with said ring gear to rotate said base ring structure and firing platform as a unit about a vertical axis, said elevation assembly further including a hydraulic pump having the outlet side thereof alternately connected to the lower and upper portions of said elevating cylinders and the inlet side thereof alternately connected to the upper and lower portions of said elevating cylinders, and a hydraulic fluid supply tank hydraulically connected to the low pressure side of the pump.

2. A charge projector adapted to be carried upon a deck of a vessel and above a predetermined compartment within the structure of the vessel comprising a stationary loading platform rigidly connected to the deck of the vessel, the base ring structure rotatably mounted upon the deck of the vessel for rotation about a vertical axis, the upper surface of said base ring structure defining a surface flush with said loading platform, a firing platform hingedly connected to said surface of said base ring structure for oscillation about a horizontal axis, a plurality of spigots mounted upon said firing platform, said base ring structure extending through an opening in the deck of the vessel and partially extending into the compartment immediately therebeneath, a platform carried by the lowermost portions of said base ring structure, an elevating mechanism including elevation cylinders carried by said platform on the lowermost portion of said base ring structure including hydraulically actuated pistons and piston rods pivotally connected to said firing platform, said base ring structure further including an external ring gear, a training mechanism carried within the compartment immediately beneath said base ring structure and drivingly connected with said ring gear to rotate said base ring structure and firing platform as a unit about a vertical axis, said elevating mechanism further including a hydraulic pump having the outlet side thereof alternately connected to the lower and upper portions of said elevation cylinders and the inlet side thereof alternately connected to the upper and lower portions of said elevation cylinders, a compensating cylinder for each elevation cylinder, a piston slidably carried within each of said compensating cylinders, a piston rod having one end thereof connected to said piston and the other end thereof pivotally connected to said firing platform, said compensating cylinders being pivotally connected to said base ring structure, the upper end of each elevation cylinder being hydraulically connected to the upper end of each compensating cylinder, and a supply tank hydraulically connected to the low pressure side of the pump.

References Cited in the file of this patent

UNITED STATES PATENTS

| | | |
|---|---|---|
| 1,351,649 | Holecek | Aug. 31, 1920 |
| 2,388,010 | Pohl | Oct. 30, 1945 |

FOREIGN PATENTS

| | | |
|---|---|---|
| 272,168 | Switzerland | Feb. 16, 1951 |

OTHER REFERENCES

Army Ordnance, July-August 1945.
Popular Mechanics Magazine, February 1946 (page 63).